July 28, 1959     L. C. FETTERLY     2,897,245
PRODUCTION OF AROMATIC HYDROCARBONS
Filed Dec. 27, 1955     2 Sheets-Sheet 1

INVENTOR
LLOYD C. FETTERLY
BY
HIS ATTORNEY

July 28, 1959  L. C. FETTERLY  2,897,245
PRODUCTION OF AROMATIC HYDROCARBONS
Filed Dec. 27, 1955  2 Sheets-Sheet 2

FIG. 3

INVENTOR
LLOYD C. FETTERLY
BY
HIS ATTORNEY

United States Patent Office 2,897,245
Patented July 28, 1959

2,897,245

PRODUCTION OF AROMATIC HYDROCARBONS

Lloyd C. Fetterly, El Cerrito, Calif., assignor to Shell Development Company, New York, N.Y., a corporation of Delaware Application December 27, 1955, Serial No. 555,505

13 Claims. (Cl. 260—668)

This invention relates to the production of methyl aromatic hydrocarbons, and more particularly to the production of such compounds which contain at least two alkyl radicals including at least one methyl radical. The invention relates more specifically to the production of methyl aromatic hydrocarbons by a process including condensation of an alkyl aromatic hydrocarbon with formaldehyde and subsequent hydrocracking of the condensation product.

Various methods have been proposed for the preparation of such compounds as the methylbenzene compounds. Thus, it has been proposed to chloromethylate toluene to chloromethyltoluene (alpha-chloroxylene) and then to replace the chlorine by hydrogen, to obtain the net result of the substitution of a methyl radical for a nuclear hydrogen atom in a substituted benzene. On the other hand, it has been proposed to alkylene aromatic hydrocarbons in vapor phase with methanol, in the presence of a phosphoric acid catalyst. However, none of the methods previously proposed for the "methylation" of aromatic compounds has proven to be entirely satisfactory, for one reason or another. The methods heretofore available have failed to provide a simple, effective and economic method for the methylation of a given aromatic compound to form the monomethyl derivative thereof.

It is, therefore, a principal object of the present invention to provide an improved process for the production of methyl-substituted aromatic hydrocarbons. A further object is to provide an improved process for the introduction of a methyl radical in substitution for a nuclear hydrogen atom of an aromatic hydrocarbon. A more specific object of the invention is to provide an effective and economical method for the production of nuclear methyl derivatives of benzene and naphthalene and of benzene compounds and naphthalene compounds. A still more specific object is to provide a method for the conversion of aromatic hydrocarbons which contain benzene or naphthalene nuclei and only hydrogen atoms and/or lower hydrocarbon radicals (1 to 6 carbon atoms), attached to nuclear carbon atoms of the benzene and naphthalene nuclei, into nuclearly substituted methyl derivatives thereof, especially those in which a methyl group has entered into an open para-position. A particular object is to provide a practical method for the synthesis of para-xylene from toluene, of pseudocumene from meta- and/or ortho-xylene, of durene from pseudocumene, of isodurene from mesitylene, of prehnitene from hemimellitene and of pentamethylbenzene from tetramethylbenzene. These objects will be better understood and others will be apparent from the detailed description of the invention, which will be made with reference to the accompanying drawings wherein:

In accordance with the present invention, it has been found that alkyl aromatic hydrocarbons having at least one para-position open opposite an existing alkyl group can be converted selectively in high yield to the corresponding methylated compounds in which the methyl group has been substituted in said open para-position, by condensing such alkyl aromatic hydrocarbon with formaldehyde by means of an acidic catalyst followed by hydrocracking of at least the resulting diarylmethane and, if desired, of arylmethyldiarylmethane (herein called triaryldimethane), if formed in the condensation.

The alkylation (or condensation) of the alkyl aromatic with formaldehyde may be carried out according to the conditions known to the prior art, e.g. with a catalyst of liquid sulfuric acid modified by the addition of a compound such as methanol, as described in British Patent No. 446,450 to Blythe et al. (accepted April 30, 1936), or according to the prior art method employing concentrated liquid sulfuric acid, referred to in said patent. It is preferred, however, to carry out the alkylation in the manner disclosed in copending application Serial No. 555,583 of L. C. Fetterly et al., filed December 27, 1955, by use of a solid acidic catalyst such as silica gel having deposited thereon a small amount of acidic material.

The diarylmethane ($Ar_2CH_2$) compounds (methylenediaryls) so produced are converted into corresponding arylmethane ($ArCH_3$) compounds and aryl ($ArH$) compounds by cracking the compounds in admixture with hydrogen accompanied by hydrogenation at an elevated temperature and pressure and in contact with a catalyst active for arylmethylene-carbon and aryl-carbon linkage cleavage and having hydrogenation activity. In general the high melting compounds of the group VI–VIII metals having an atomic number of at least 24 are suitable, particularly the variable valence metals, and more particularly combinations of at least two of them. A particularly suitable catalyst for this purpose is, for example, a tungsten-nickel sulfide catalyst such as is utilized commercially for the dehydrogenation of methylcyclohexane to toluene. Mixed sulfides of Mo and W, per se or supported on a porous base such as $Al_2O_3$, comprise another preferred catalyst. The dehydrogenating metal sulfides are a preferred class of catalysts for the process, particularly the group VI metal sulfides, as, for example, the sulfides of tungsten, molybdenum and chromium, and the sulfides of metals of atomic number from 25 to 28. Composites of a metal sulfide from each of these groups are especially preferred. Corresponding oxides and composites thereof are also suitable catalysts for the present purpose, as well as composites of oxides and sulfides. Also, other active substances can be used, including especially essentially neutral high melting substances such as activated carbon.

The diarylmethane compounds, which may be represented by the formula Ar—$CH_2$—Ar', wherein the "Ar" groups are usually the same aryl radicals having the same empirical formulas, although they may be different position isomers and can be even different types of radicals, are cracked in the practice of the invention, with hydrogenation, to yield two substances, one an arylmethane (Ar—$CH_3$) and the other a corresponding aryl compound, Ar'H. The gross hydrocracking reaction can be represented by the equation $$Ar—CH_2—Ar' + H_2 = ArCH_3 + Ar'H$$

Thus, the net result of the reaction is the cleavage of a C—C bond between the methylene (—CH$_2$—) carbon and a carbon atom of one of the aromatic rings and a saturation with hydrogen of the two bond fragments. The kinetics or mechanism whereby this result is effected is not clear, although it is considered to involve more than a mere carbon-to-carbon cleavage and hydrogenation. In any case, the invention is not to be limited by any theory as to its operation.

In the preparation of diarylmethanes by alkylation of aromatic hydrocarbons with formaldehyde, particularly the alkylation of certain alkyl aromatics (e.g. para-xylene or durene), generally there will be produced more or less of further alkylation products thereof. Thus, some of the diarylmethane compound is converted into a triaryldimethane compound, a so-called "trimer," represented by Ar—CH$_2$—Ar—CH$_2$—Ar. These triaryldimethane or arylmethyldiarylmethane compounds are also cracked in the same manner and under similar conditions to yield two molecules of methyl aromatics and one molecule of the original aromatic. Even higher polymers are cracked similarly. It is contemplated, in the present invention, to crack the mixture of dimer, trimer and other polymer which may be obtained by the alkylation, the polymer preferably being kept to a minimum, e.g. by employing the improved alkylation process of said application of Fetterly et al.

An examination of the equations for the reactions for (1) the formation of the dimer and (2) the cracking of the dimer; namely, (1)     $2ArH + CH_2O = ArCH_2Ar + H_2O$ (2)     $Ar—CH_2—Ar + H_2 = ArCH_3 + ArH$ shows that the overall result is the conversion of one mole of aromatic compound (ArH) to one mole of corresponding methyl aromatic or arylmethane (ArCH$_3$) for each two moles of initial aromatic feed. However, one mole of the aromatic compound is produced in the second stage, which can be recycled to the first stage. Thus, the theoretical net consumption of aromatics is one mole for each mole of desired methyl aromatic produced. Therefore, a preferred method of practicing the invention comprises: (1) alkylating the aromatic compound, such as toluene, with formaldehyde in the presence of an acidic catalyst to produce the diarylmethane (ditolylmethane), which will normally be a mixture of isomers (p-p', o-p, m-p) predominating in the p-p' isomer; (2) cracking the diarylmethane product, either the total alkylate, or the portion from which the higher polymers have been removed, as by distillation, to yield a mixture of isomeric methyl aromatic compounds (xylenes, predominantly the para-isomer) and of corresponding aromatic compound (toluene); (3) separating the produced methyl aromatics from "regenerated" aromatic as by distillation whereby the "regenerated" aromatic (toluene) is recovered as overhead distillate; (4) and recycling the "regenerated" aromatic to the alkylation step. When the alkylation results in an appreciable proportion of polymer, for example, tetramer and higher, it is preferable to separate the polymer as by distillation, and to crack the fractions separately under somewhat different conditions, because of the greater tendency of the higher boiling materials to deactivate the catalyst under the same conditions. The cracked streams are then combined and processed together.

In the preparation of xylenes, the separated xylene isomer mixture can then be de-orthoized, as by distillation, and the para-xylene readily recovered in high yield and substantially pure.

It has been found that the compounds which have an open para-position opposite an existing alkyl group are converted in high yield to the compounds methylated in said para-position, in the process according to the present invention. Table I illustrates the selectivity of the production of compounds methylated in the para-position when alkylating and hydrocracking in accordance with the present invention. In case of hemimellitene, there are two such compounds formed: prehnitene, in which the methyl group has been added in a position that is para to one of the methyl groups, ortho to another, and meta to a third; and isodurene, in which the methyl group is added in a position that is para to one methyl group and meta to each of the two others.

TABLE I

| Charge | Product | Percent selectivity |
|---|---|---|
| Toluene | para-Xylene (1,4-dimethylbenzene). | 76 |
| ortho - Xylene (1,2 - dimethylbenzene). | Pseudocumene (1,2,4 - trimethylbenzene). | 96 |
| meta - Xylene (1,3 - dimethylbenzene). | Pseudocumene (1,2,4 - trimethylbenzene). | 95 |
| Pseudocumene (1,2,4-trimethylbenzene). | Durene (1,2,4,5-tetramethylbenzene). | 92 |
| Mesitylene (1,3,5 - trimethylbenzene). | Isodurene (1,2,3,5-tetramethylbenzene). | 100 |
| Hemimellitene (1,2,3-trimethylbenzene). | Prehnitene (1,2,3,4 - tetramethylbenzene). | 75 |
|  | Isodurene (1,2,3,5-tetramethylbenzene). | 25 |

The selectivity to para-methylated compounds exceeds 90% for each of these charge stocks, except toluene which shows a still very high selectivity of 76% to para-xylene. The tetramethylbenzene charge stocks are not illustrated since they all lead to a single possible methylated product, pentamethylbenzene.

It has been further found that the reactivity of alkyl substituted aromatic hydrocarbons in the condensation with formaldehyde in the presence of acidic catalyst varies, so that further selective results can be obtained in the combination of alkylation and hydrocracking.

Specifically, it has been found that for the C$_8$ aromatics the reactivity with formaldehyde decreases in the order meta-xylene>ortho-xylene>para-xylene>ethylbenzene. The relative rates of disappearance of individual isomers from the reaction mixture vary with the concentration of the component in the mixture. For example, when the proportion of meta-xylene in a mixture is equal to or greater than that of para-xylene its reaction is 10 or more times of that of para-xylene. Even when the concentration of meta-xylene is only about 5% that of para, its reaction rate is still about 5 times as great. When ortho-xylene is present in an amount at least about ⅓ of the para-xylene, it reacts at least twice as rapidly as para-xylene. Thus, for example, by reacting with a mixture of xylenes an amount of formaldehyde corresponding to the more reactive xylenes present, the meta-xylene and ortho-xylene can be to a considerable extent selectively converted to the corresponding condensation products, mainly the diarylmethanes, and the concentration of para-xylene and ethylbenzene in the unconverted C$_8$ fraction can be greatly increased in this manner.

On fractionating the total condensation reaction product after a batch reaction of mixed xylenes the C$_8$ cut contains para-xylene in high concentration; substantially pure para-xylene is readily recovered from such concentrate, e.g. by crystallization, or even by fractional distillation to remove the remaining ortho-xylene when the meta-xylene has been substantially completely removed.

In a continuous condensation reaction charging mixed xylenes, the para-xylene content of the C$_8$ fraction recovered from the total condensation reactor effluent is controlled by controlling the amount of para-xylene which is removed from the C$_8$ fraction before the remainder is returned to the condensation zone.

The invention is of particular utility for the production of durene, wherein pseudocumene is alkylated and the dipseudocumylmethane is hydrocracked to durene and pseudocumene. The pseudocumene can be prepared from meta-xylene by alkylation with formaldehyde and hydrocracking the alkylate, di-meta-xylylmethane (di-(2, 4-dimethylphenyl)methane), by the process of this invention. Pseudocumene is also readily available in certain refinery streams, such as bottoms by-product streams from the production of aromatics, including xylenes, by various hydroforming operations. Thus, an illustrative refinery xylene bottoms by-product having a precision boiling range of about 150° C. to 205° C., has the composition as shown in Table II, with the boiling points being given for the individual components.

TABLE II.—COMPOSITION OF XYLENE BOTTOMS

| Component | Percent V. | B.P., ° C. at 1 atm. |
|---|---|---|
| Pseudocumene | 53 | 169.3 |
| Mesitylene | 19 | 164.8 |
| Hemimellitene | 9 | 176.1 |
| Propylbenzene: | | |
| iso- | 7 | 152 |
| n- | | 159 |
| Methyl Ethyl Benzenes | 5 | 160-164 |
| $C_{10}$-Aromatics | 7 | 182-204 |
| Non-Aromatics | | |

By fractional distillation, the three trimethylbenzenes are easily concentrated further in a heart cut. By making the fractionation sufficiently sharp, a large proportion of the hemimellitene is also readily rejected from the pseudocumene concentrate, so that the concentrate is comprised essentially of pseudocumene and mesitylene with a very small proportion of hemimellitene and only a small proportion, not over about 1–2%, of methyl ethyl benzene. This pseudocumene concentrate is then alkylated and the resulting alkylate is hydrocracked in accordance with the invention to yield durene. The pseudocumene alkylates primarily to the bis-(2,4,5-trimethylphenyl)methane, thus giving by hydrocracking primarily durene as the tetramethyl benzene compound, one molecule of pseudocumene being regenerated. A minor portion of the pseudocumene goes to bis-(2,3,5-trimethylphenyl)methane, which on hydrocracking yields isodurene and pseudocumene. And a further minor portion alkylates to the mixed $C_{19}$-isomer, 2,2′,3,4′,5,5′-hexamethyldiphenylmethane, some of which on hydrocracking yields durene, in addition to "regenerated" pseudocumene, while the other yields isodurene, depending on which aromatic ring is cleaved from the methylene carbon atom. The mesitylene alkylates essentially to only one dimer, bis-(2,4,5-trimethylphenyl)methane, which hydrocracks to isodurene and mesitylene. The hemimellitene present alkylates to three dimers, which hydrocrack to "regenerate" hemimellitene and a mixture of isodurene and prehnitene. The "regenerated" trimethylbenzenes are readily separated by distillation and recycled to the alkylation, where desired. The durene (M.P. 79–80° C.) is readily crystallized in good yield from the isodurene (M.P. 24° C.) and prehnitene (M.P. 4° C.) in the separated fraction.

The alkylation employing liquid sulfuric acid is carried out by contacting the formaldehyde and the desired aromatic hydrocarbon with a liquid acid containing at least about 60% $H_2SO_4$, the remainder being water or a suitable modifying agent such as methyl alcohol. It is preferred to employ liquid acid containing from 60% to 70% by weight $H_2SO_4$, from 0 to 30% by weight methanol and from 0 to 40% $H_2O$, a particularly preferred acid containing about 60% $H_2SO_4$ 31% methanol and 9% water. The alkylation is carried out at a temperature in the range between 50° and 110° C. and preferably between 80° and 90° C. Atmospheric pressure is conveniently employed but lower or higher pressures may also be employed provided the pressure is sufficient to maintain the reactants in the liquid phase at the reaction temperature.

The reaction may be carried out by adding the catalyst and the reactants to the reaction vessel, bringing it to the desired temperature and agitating from 10 to 30 minutes. Alternatively, the catalyst may be placed in the reaction vessel and the reactants gradually added over a period of time, or the reaction may be carried out in a continuous manner with addition of reactants and withdrawal of reaction product.

In the preferred method of operation, employing solid acidic catalyst, the reaction is also carried out in the liquid phase. An agitated slurry of catalyst particles suspended in a liquid body comprising aromatic hydrocarbon charge stock and, generally, some product is maintained in a heated reaction zone at a temperature which permits removal of all water added to and formed in the reaction zone in the form of a vapor stream comprising the water and some of the hydrocarbon. Formaldehyde is added to the reaction zone either as anhydrous formaldehyde or as aqueous formaldehyde containing from 5 to 60% HCHO, e.g. 37% formalin. Any water which is added with the formaldehyde, together with the water formed in the reaction, is immediately removed by withdrawing a vapor stream of water and aromatic. The vapors withdrawn from the reaction zone are condensed; the aromatic hydrocarbon is suitably returned to the reaction zone. The reaction can be carried out in a batchwise operation by charging a desired amount of the aromatic hydrocarbon to the reaction zone together with the required amount of catalyst and gradually adding sufficient formaldehyde to produce the desired amount of the diarylmethanes. In the continuous method of operation, a body of liquid comprising catalyst slurry in aromatic charge hydrocarbon and product is maintained in the reaction zone, fresh aromatic hydrocarbon charge and formaldehyde are continuously added and a bleed stream of the liquid is continuously withdrawn for recovery of product therefrom, and return of unconverted charge hydrocarbon to the reaction zone.

In the operation with solid acidic catalyst, temperatures in the range between 100° and 200° C. are preferred, though temperatures up to 250° C. may be employed. Atmospheric pressure is preferably employed although higher pressures may be used, especially with a relatively low boiling hydrocarbon. With the preferred hydrocarbon feed stocks and catalysts the condensation reaction is very nearly instantaneous, being ordinarily substantially complete within 2 to 5 seconds after the addition of an increment of monomeric formaldehyde. The rate of addition of formaldehyde is controlled such that no more formaldehyde is added to a reaction mixture at any time than can be completely converted to condensation product within a time of less than 1 minute, preferably less than 15 seconds and most preferably less than 5 seconds. The ratio of feed aromatic hydrocarbon to unreacted formaldehyde monomer in the reaction slurry is therefore very high, e.g. from 30 to 2000 moles of aromatic per mole of formaldehyde.

The solid acidic catalysts for use in the slurry method of alkylation are solids of substantial porosity and acidity, employed in finely divided form. A particularly suitable catalyst consists of silica gel containing adsorbed thereon sulfuric acid in an amount ranging between 0.1 and 15% by weight based on the support, a preferred concentration of sulfuric acid being 0.4 to 2.5% by weight. Other mineral acids such as phosphoric acid and phosphotungstic acid, supported on silica gel in similar concentrations, may also be employed. Another suitable catalyst is a calcined composite of silica gel containing a small amount of alumina, in the range between 0.1 and 5% by weight and preferably between 0.5 and 4% by weight, although catalysts with higher alumina content may also be employed provided they are calcined by heating at a temperature between 400° and 700° C. for from 2 to 48 hours, the shorter times being used at the higher temperatures.

In general, the solid acidic catalysts which may be employed in the slurry method of alkylation have in common a relatively high surface area and porosity, a pronounced amount of acidity and a substantial absence of acid sites having an acid strength as great as that of concentrated liquid sulfuric acid.

If the solid catalysts become contaminated by carbonaceous deposits during the course of the condensation reaction, they are readily regenerated by a conventional oxidative regeneration, e.g. by burning the catalyst with a gas containing a controlled amount of free oxygen, such as air. If part or all of the mineral acid, such as sulfuric acid, is lost from the silica gel during regeneration, it is replaced before reuse of the catalyst.

The cracking-hydrogenation of the diarylmethanes is readily effected by passing a suitable mixture of the feed alkylate and hydrogen over the heated catalyst at a sufficiently elevated temperature and under a suitable superatmospheric pressure. A broad range of mole ratios of hydrogen to alkylate can be utilized, in general a ratio of from about 1 to about 20 being suitable, with a ratio of from about 2 to 10, and particularly about 4 or 5, giving especially satisfactory results. The temperature in the reaction zone is advantageously maintained at about 400–450° C. with a pressure of about 250–275 p.s.i.g., although higher and lower temperatures such as 500° C. and 350° C., respectively, are effective with pressures which may be from about 100 p.s.i.g. to about 500 p.s.i.g., or even lower or higher. A contact time corresponding to a liquid hourly space velocity (LHSV) of about 5 has been found to be particularly effective although the space velocity may range suitably from a value as low as about 1-LHSV to as high as about 20-LHSV. It will be understood that the optimum set of conditions will depend on a number of variable factors, including the particular catalyst employed, the particular alkylate feed and whether it is a single compound or a mixture of polymers, the particular apparatus employed, and the like.

The cracking-hydrogenation of the diarylmethanes is slightly exothermic in character ($\Delta H = $ ca. 18,000 B.t.u./lb. mole $H_2$ reacted) although usually of such a small amount that no particular problem of heat removal is presented. The feed mixture of alkylate and hydrogen is normally preheated to about the reaction temperature prior to contacting it with the catalyst.

The reaction can be suitably carried out by passing the alkylate and hydrogen over or through a fixed bed or mass of the catalyst in particulate form, such as a bed of pellets or a packed section thereof in a confined reaction zone. On the other hand, the reaction can be readily carried out by passing the preheated mixture of alkylate and hydrogen through a fluidized catalyst mass, and the temperature of the catalyst mass can be readily controlled by any suitable means, such as by providing heat transfer tubes disposed in the catalyst zone or by cycling a portion of the catalyst to an external heat exchanger and back to the reaction zone.

Figure 1:
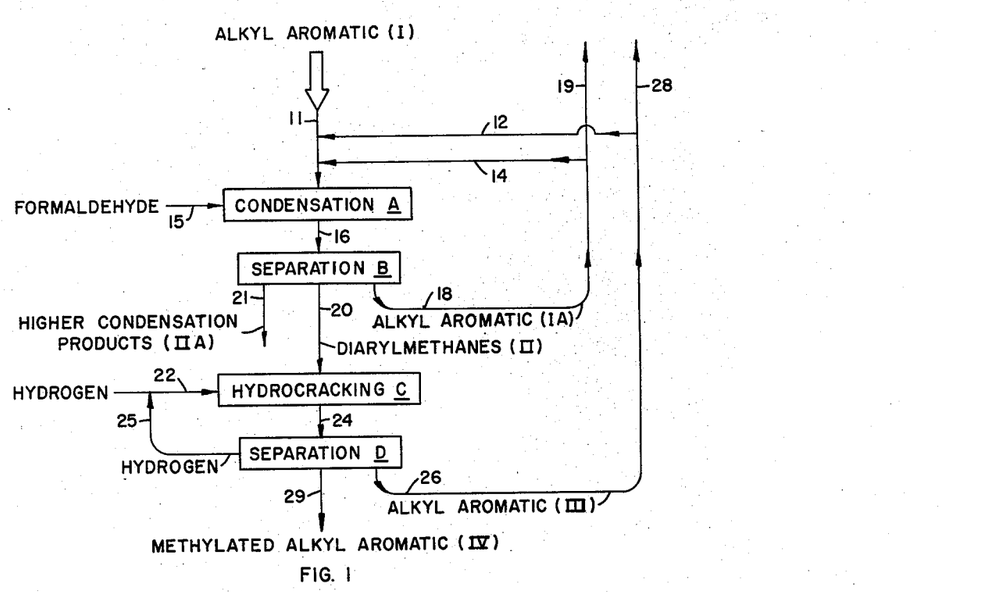
Fig. 1 is a schematic representation of the process steps and their combination as used in the practice of the invention.

The broad aspects of the invention are further illustrated by reference to Fig. 1. A suitable alkyl aromatic or mixture of alkyl aromatics (I) is added through line 11 to condensation zone A where at least a portion thereof is reacted with formaldehyde to produce at least the corresponding diarylmethanes and, sometimes, higher condensation products such as the triaryldimethanes. Additional portions of I may be added through lines 12 and 14 from sources described below. The total condensation product from condensation zone A passes through line 16 to separation zone B, which may be a fractional distillation zone. From zone B there is withdrawn through line 18 the unconverted portion of the charge, designated as IA. This may be identical in composition to I or may be enriched in isomers and inerts which were not reacted in the condensation step. Stream IA may be returned to zone A via lines 14 and 11 or all or part thereof may be withdrawn from the system through line 19. This may include a further separation step, to remove through line 19 a selected portion of stream IA. At least the diarylmethanes II produced in the condensation step are withdrawn from zone B through line 20 and charged to hydrocracking zone C where they are hydrocracked with hydrogen added through line 22. If desired, the heavier condensation products such as triaryldimethanes or tetraaryltrimethanes and higher, designated IIA may be withdrawn separately from zone B through line 21 and may be charged to hydrocracking separately or together with the diarylmethanes, or they may be withdrawn from the system for other use. The total effluent from hydrocracking zone C is charged through line 24 to separation zone D, which may be a fractional distillation zone. Separated hydrogen is withdrawn through line 25 and may be returned to line 22. Alkyl aromatic III, having the same number of carbon atoms per molecule as charge I, is withdrawn through line 26 and may be returned to line 11 through line 12 or all or a part thereof may be withdrawn through line 28, which may include a further separation step. The product IV, consisting of one or more alkyl aromatics, having one more methyl groups attached to the ring than charge I, is withdrawn through line 29. This stream may also be subjected to further separations to recover desired isomers in high purity.

In a typical operation according to the method just described, charge I is substantially pure toluene. IA represents toluene which was not converted in condensation zone A and is returned for further reaction via lines 18, 14 and 11. II represents ditolylmethanes of approximately the following distribution: 50% p-p'-ditolylmethane, 44% o-p-ditolylmethane and 6% m-p-ditolylmethane; essentially no o-o-, o-m-, nor m-m- isomers are produced. IIA represents a relatively small quantity of tritolyldimethanes and higher condensation products. III represents toluene regenerated from the ditolylmethanes and IV represents a mixture of xylenes consisting of approximately 76% para-xylene, 20–22% ortho-xylene and 3–4% meta-xylene.

In another typical operation, I represents meta-xylene, IA unconverted meta-xylene from the condensation step for recycle thereto, and II dixylylmethanes of approximately the following distribution: Over 90% bis(2,4-dixylyl)methane, the remainder being a mixture of 2,3',4,5'-tetramethyldiphenylmethane and 2,2',4,6'-tetramethyldiphenylmethane. IIA may be nil since meta-xylene can be quantitatively converted to the dixylylmethanes, III is meta-xylene regenerated in the hydrocracking step, and IV is a mixture of trimethylbenzenes consisting of 96% pseudocumene, the remainder being mesitylene and hemimellitene.

A further typical operation will be described by means of Fig. 1 to illustrate the use of the present invention in the production of pseudocumene and recovery of para-xylene from a feed comprising meta- and para-xylene. The alkyl aromatic I added to the system from an outside source through line 11 consists of 10 moles per hour, each, of meta-xylene and para-xylene. Alkyl aromatic III returned to zone A via lines 11, 12 and 26 consists of 10 moles per hour of meta-xylene and 1 mole per hour of para-xylene. The portion of alkyl aromatic IA returned to zone A via lines 11 and 14 consists of 20 moles per hour or meta-xylene and 11 moles per hour of para-xylene. Condensation zone A represents a reaction system operating continuously, e.g. with employment of solid acidic catalyst in the manner described. The reactor in zone A contains a liquid mass consisting of 20 moles of meta-xylene, 20 moles of para-xylene, 10 moles of bis(meta-xylyl)-methanes, and 1 mole of bis-(para-xylyl)methanes. Eleven moles per hour of formaldehyde is added through line 15. The total liquid withdrawn to separation zone B through line 16 consists of 20 moles per hour, each, of meta-xylene and para-xylene, 10 moles per hour of bis(meta-xylyl)methanes and 1 mole per hour of bis(para-xylyl)methanes. Alkyl aromatic IA in line 18 consists of 20 moles per hour, each, of meta- and para-xylene. Of this, 9 moles per hour of purified para-xylene is withdrawn from the system as product through line 19 (utilizing a suitable separation, not shown) and the remainder is returned to zone A. The diarylmethanes II in line 20 consist of 10 moles per hour of bis(meta-xylyl)methanes and 1 mole per hour of bis(para-xylyl)methanes. No higher condensation product IIA is formed. The diarylmethanes II are hydrocracked and the products separated to recover as product 11 moles per hour of pseudocumene IV through line 29 and a xylenes stream III of the composition given above, which is returned to zone A; nothing is withdrawn through line 28.

In the above example the compositions of the various products streams have been slightly simplified for easier understanding. The product distributions are based on a relative reaction rate of meta- and para-xylene with formaldehyde of 10:1. Relative reaction rates vary somewhat with the ratio of reactants in the reaction zone and the reaction conditions, such as catalyst activity, temperature and so forth. The relative concentration of reactants maintained in zone A can be varied arbitrarily over a wide range by making appropriate variation in the rate at which the fresh feed is added and the product streams are withdrawn. In order to produce para-xylene in accordance with the method described, it is desirable to maintain the concentration of para-xylene in the total xylene cut in the alkylation reactor at 40% or higher. Para-xylene is readily recovered in a simple crystallization step from such a concentrate. The concentration of para-xylene is preferably maintained sufficiently high so that it can be separated by crystallization at temperatures between —30° C. and 0°C.

A specific application of the present invention, illustrating the use of the invention for producing both para-xylene and pseudocumene from a feed consisting entirely of toluene, will be described by reference to Fig. 2. Toluene from a source not shown is charged to condensation zone A through line 211, together with toluene, from a source described below, added through line 212 and xylenes, produced in the system, added through line 214. Formaldehyde is added through line 215. The total reaction mixture from condensation zone A is withdrawn through line 216 to separation zone B, which may be a fractional distillation system in which unreacted toluene is withdrawn through line 218 for return to condensation zone A via line 212, and unreacted xylenes are withdrawn through line 219 to separation zone E, which may represent a fractional crystallization system in which para-xylene of very high purity is withdrawn through line 221 and the remaining xylenes are withdrawn through line 222 for return to condensation zone A via line 214. The condensation products, which consist essentially of ditolylmethanes, dixylylmethanes and tolyl-xylylmethanes, and which may contain some higher condensation products, are withdrawn through line 220 and passed to hydrocracking zone C where they are cracked in the presence of hydrogen added through line 224. The effluent from hydrocracking is passed through line 225 to separation zone D, which may be a fractional distillation system in which hydrogen is withdrawn through line 230 for return to line 224, regenerated toluene through line 226 for return to condensation zone A via line 212, and a mixture of xylenes through line 228 for return to condensation zone A via line 214. The xylenes mixture consists of the xylenes regenerated by hydrocracking of the condensation products. A trimethylbenzene stream containing in excess of 90% pseudocumene is withdrawn from separation zone D through line 229 and may be further purified if desired.

Figure 2:
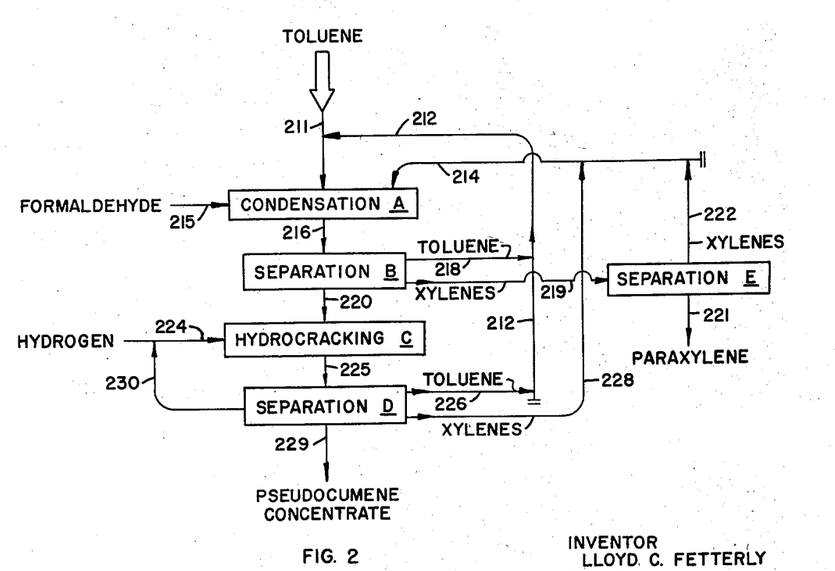
Fig. 2 is a schematic representation of a combination of process steps used in a further practice of the invention.

In the operation according to Fig. 2, advantage is taken of the selectivity of the alkylation of meta- and ortho-xylene with formaldehyde by virtue of their higher alkylation rates to convert them selectively to pseudocumene, and to recover para-xylene as a product. The toluene streams in lines 218 and 226 and the xylenes streams in lines 222 and 228 need not be completely recycled to condensation zone A. For example, if the toluene charge in line 211 contains inerts, such as paraffins, these would be found concentrated in line 218 and that stream may then be withdrawn in whole or in part for purification or for other use. The xylenes streams may also be withdrawn for other uses, either in whole or in part, or further separated into isomers other than para-xylene.

Figure 3:
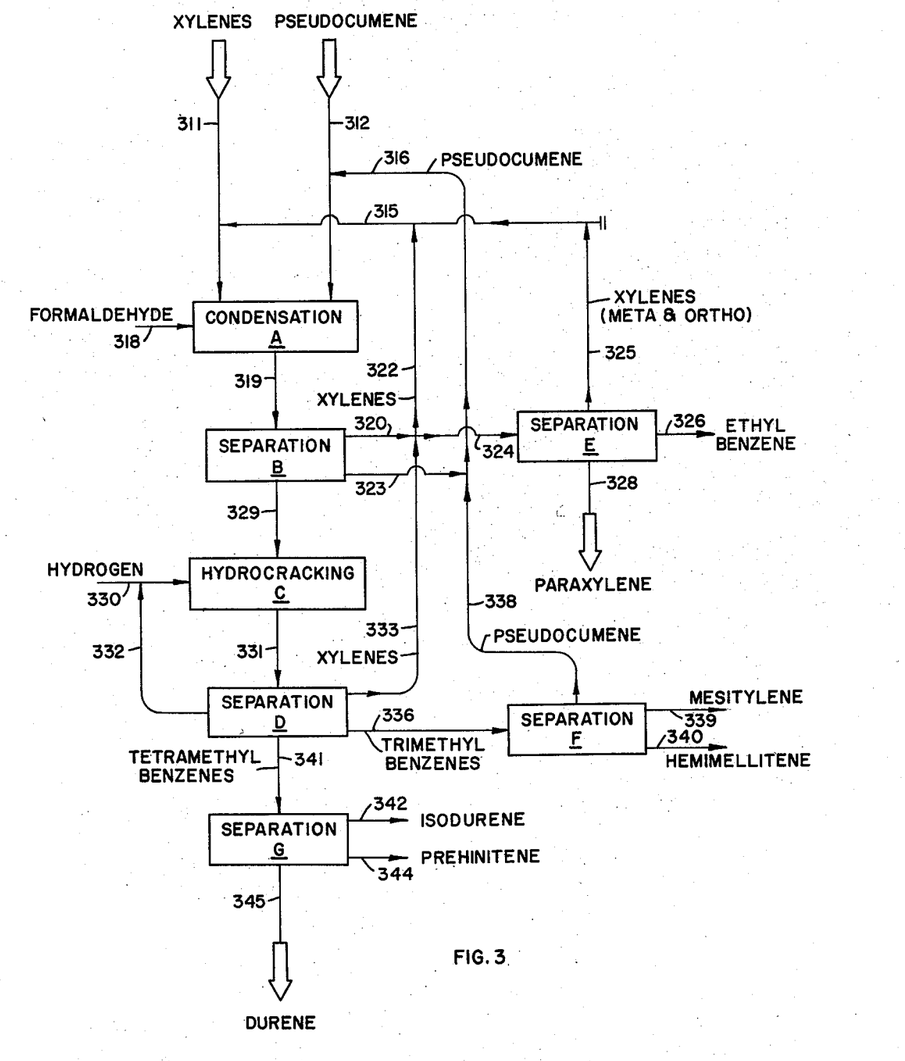
Fig. 3 is a schematic representation of a combination of process steps used in a further modification of the invention.

A further specific use of the present invention for the production of durene as a major ultimate product from xylene or from xylene and pseudocumene is illustrated by reference to Fig. 3. The charge to this process, added through line 311, contains at least meta- or ortho-xylene and is preferably a mixed $C_8$ aromatic stream containing the three xylene isomers and, preferably, the smallest practical proportion of ethylbenzene. If desired, pseudocumene from an extraneous source may also be added to condensation zone A, through line 312. This may be pure pseudocumene or a pseudocumene concentrate such as referred to above, but in the preferred operation the pseudocumene used is generated in the process. Xylenes and pseudocumene produced or recovered within the system are returned to condensation zone A via lines 315 and 311 and lines 316 and 312, respectively. Formaldehyde is added to condensation zone A through line 318. The total condensation product is charged through line 319 to separation zone B, which may be a fractional distillation zone, where a xylenes stream is taken through line 320 and a pseudocumene stream through line 323. The xylenes stream may be returned to condensation zone A via lines 322, 315 and 311. If the charge in line 311 consisted of mixed xylenes, the xylenes stream is suitably passed to separation zone E via line 324. Separation zone E may be, for example, a combination of fractional distillation and crystallization to achieve the desired separations. Purified para-xylene is withdrawn from zone E through line 328, ethylbenzene through line 326 and mixed xylenes through line 325 for return to zone A. The pseudocumene in line 323 represents material which was not converted in condensation zone A. It is returned to zone A via lines 316 and 312.

The condensation products are withdrawn from zone B through line 329 and charged to hydrocracking zone C for hydrocracking in the presence of hydrogen added through line 330. The effluent from hydrocracking is passed through line 331 to separation zone D which may be a fractional distillation system from which separated hydrogen may be returned to line 330 via line 332, recovered xylenes are withdrawn through line 333, trimethylbenzenes through line 336 and tetramethylbenzenes through line 341. The xylenes in line 333, produced by hydrocracking of xylene-containing condensation product, are returned to condensation zone A via lines 322, 315 and 311. The trimethylbenzenes in line 336 are produced in part by hydrocracking of dixylylmethanes and of mixed condensation product of xylenes and trimethylbenzenes, and in part regenerated, by hydrocracking, from bis(trimethylphenyl)methanes and corresponding higher condensation products. They contain a high proportion of pseudocumene which is separated in separation zone F, which may be a fractional distillation system. Pseudocumene is returned from zone F to zone A via lines 338, 316 and 312. Small quantities of mesitylene and hemimellitene are withdrawn through lines 339 and 340, respectively. The tetramethyl benzenes in line 341 represent the product from hydrocracking of bis(trimethylphenyl)methanes and corresponding higher condensation products, and consist essentially of durene and small quantities of isodurene and prehnitene. This material may be further separated in separation zone G, e.g. by fractional crystallization, into substantially pure durene withdrawn through line 345 and a mixture of isodurene and prehnitene which may be further separated, e.g. by fractional distillation into isodurene withdrawn through line 342 and prehnitene through line 344.

The above processing sequences described by means of the drawings, and the following detailed description of illustrative examples of the practice of the invention are given for the purpose of a better understanding thereof and are not to be considered as limitative thereon.

*Example I.—Alkylations with liquid acidic catalysts*

(A) Alkylation of toluene. Toluene was alkylated with aqueous 37% formaldehyde (formalin) using aqueous 60–70% sulfuric acid as catalyst at 80° C.–100° C. and 10–30 minutes contact time. The recovered alkylate in this case consisted of ditolylmethane (DTM), tritolyldimethane ("trimer") and heavier polytolylpolymethane ("polymer") in a weight ratio of 62:12:26, respectively. The yield of mixed alkylate was 99–100%, based on toluene converted and 95–100%, based upon the formaldehyde. Since the sulfuric acid is relatively dilute, little if any sulfonation of toluene or product occurred and acid consumption was negligible.

The dimer, trimer and higher polymer are readily separable by distillation. The dimer (DTM) fraction contained an isomer distribution of approximately 60% p-p′, 35% o-p′ and 5% m-p′, as determined by infrared analyses and from analyses of the products from subsequent cracking in accordance with the invention.

(B) Alkylation of toluene. Toluene was alkylated with formaldehyde in the presence of a sulfuric acid, methanol, water mixture and summarized in the following tabulation:

Temperature ______________ 90–100° C.
Pressure __________________ Atmospheric.
Catalyst composition, percent w.:
 $H_2SO_4$ ________________ 63.
 $CH_3OH$ ________________ 20.
Product distribution, percent w.:
 Dimer ___________________ 81.
 Trimer __________________ 14.4.
 Higher mol. wt. _________ 4.6.
Yield based on toluene ______ 96.9% m.
Yield based on formaldehyde __ 96.4% m.
Methanol recovery __________ 57+% m. as $CH_3OH$, 41% m. as $CH_3OH$—$H_2SO_4$ reaction product.
Sulfuric acid recovery ______ 66.7% w. as titratable acid, 33.3% w. as $CH_3OH$—$H_2SO_4$.
Reaction time ______________ 20 minutes.
Conversion of toluene ______ 45% wt.

(C) Alkylation of toluene. When toluene was alkylated with formalin to a 23.5% alkylate level (conversion) in toluene with a reaction time of 30 minutes and using a 1:1 volume mixture of 96% $H_2SO_4$ and methanol as catalyst, the distribution ratio of 85:15:0 for dimer: trimer:higher, respectively, was obtained. The yield of product, based upon toluene and formaldehyde converted, was above 96%.

A product having a distribution ratio of 90:7:3 of dimer:trimer:polymer was obtained at a 41% alkylate level and a reaction time of 15 minutes when using a 1:1.1 volume ratio of 96% $H_2SO_4$ and methanol as catalyst.

(D) Alkylation of xylenes. The three isomeric xylenes, o-, m- and p-, were separately alkylated with formaldehyde, using sulfuric acid as catalyst in aqueous methanol solvent. The product distributions in the alkylates of the three cases are tabulated in Table III.

TABLE III

| Xylene Alkylated | Methyl Positions on Diphenylmethane | Percent mol |
|---|---|---|
| o-xylene | 3,4,3′,4′ | ca. 93 |
|  | 3,4,2′,3′ | 6 |
|  | 2,3,2′,3′ | 1 |
| m-xylene | 2,4,2′,4′ | 90 |
|  | 2,4,2′,6′ | 9 |
|  | 2,4,3′,5′ | 1 |
| p-xylene | 2,4,2′,4′ | 100 |

(E) Alkylation of pseudocumene. Pseudocumene (1,2,4-trimethylbenzene) was alkylated with formaldehyde in the presence of aqueous methanolic sulfuric acid as catalyst, at a temperature of 50–80° C. and a reaction time of 20 minutes. A yield of 99%, based on converted pseudocumene, was obtained, of a product which, when recrystallized had the following properties: melting point, 70–72° C.; mol. wt.=ca. 250; molecular formula— $C_{19}H_{24}$. From analyses, including the fact that the tetramethylbenzene product obtained by cracking it by the process of this invention was predominantly durene, this product was considered to be predominantly bis-(2,4,5-trimethylphenyl)methane. About 8% by weight of isomeric material was obtained, an approximately equal mixture of the isomers, bis-(2,3,5-trimethylphenyl)methane and 2,2′,3,4′,5,5′-hexamethyldiphenylmethane.

*Example II.—Alkylations with solid acidic catalysts*

(A) Alkylation of mixed xylenes using silica gel-sulfuric acid catalyst. A mixture of xylenes containing 4% ethylbenzene, 28% para-, 63% meta-, and 5% orthoxylene was alkylated with aqueous 37% formaldehyde (formalin) using a catalyst of 5% $H_2SO_4$ supported on 28 to 200 mesh particles of silica gel of 750 to 800 sq. meter per gram surface area. The reaction was carried out as a batch reaction in a vessel equipped with a stirrer for the liquid zone, an inlet line for addition of aqueous formaldehyde solution and an outlet from the vapor zone leading to a condenser and phase separator vessel. Twenty volumes (bulk volume) of the catalyst and 100 volumes of the xylenes charge were placed in the reactor vessel. In addition, 16 volumes of the xylenes charge was placed in the phase separator vessel. The liquid in the reaction vessel was stirred and the resulting slurry heated by an external heating jacket to a temperature of 135° C. After reflux of the aromatic hydrocarbon from the condenser was established, 10 volumes of 37% formalin was added in small increments to the vessel at a rate slightly below that which would cause boiling of the mixture from the top of the condenser. The addition of formalin was completed in 30 minutes, the reaction temperature being maintained at 130 to 135° C. during the addition. The aqueous portion of the material taken overhead was continuously condensed and withdrawn from the phase separator. After addition of formalin was completed, heating and stirring were discontinued and the catalyst allowed to settle, after which the liquid product mixture was withdrawn from the vessel by decantation. The degree of aldehyde conversion was determined by analyzing for unreacted aldehyde withdrawn in the aqueous phase and remaining in the liquid product.

The product was worked up by batch distillation in which first unconverted formaldehyde was taken overhead, then unconverted xylene mixture, and finally the dixylylmethanes. It was found that 90 mole percent of the formaldehyde added and 30 mole percent of the mixed xylenes had been converted to useful product. The recovered product had the following characteristics:

Alkylate:
    Molecular weight of alkylate fraction__________ 222
    Percent diarylmethane _______________________ 100
Total product:                          Percent weight
    Xylene fraction _____________________________ 68
        Ethylbenzene _______________________ 5
        Para-xylene _________________________ 25
        Meta-xylene ________________________ 36
        Ortho-xylene _______________________ 2
    Diarylmethane _______________________________ 32
    Triaryldimethane ____________________________ 0
                                              100

(B) Alkylation of mixed xylenes using silica gel-$H_2SO_4$ catalyst. In a manner substantially identical to Example IIA a mixed feed containing 4.5 mole percent ethylbenzene, 4.7 mole percent ortho-xylene, 27.9 mole percent para-xylene and 62.9 mole percent meta-xylene was reacted with aqueous formalin. Formaldehyde conversion was 94% and of the total aromatic feed 30 mole percent was converted to condensation product. Based on the amount of each of the isomers in the feed to the reaction it was found that no ethylbenzene had been converted, approximately 37% of the ortho-xylene, about 42% of the meta-xylene and only about 7% of the para-xylene had been converted to the respective diarylmethanes.

(C) Alkylation of various aromatics using silica gel-$H_2SO_4$ catalyst. In a manner similar to that described in Example IIA a number of runs were made in which a variety of different aromatic hydrocarbon feeds were reacted with aqueous formalin of 37% concentration. Operating conditions and results of these runs are tabulated in Table IV. The component analyses of the mixed hydrocarbon feeds are shown in Table V. In all of these runs the catalysts employed were sulfuric acid supported on silica gel of high surface area and small pore size. The percent of formaldehyde conversion shown in Table IV is a measure of the reactivity of the respective hydrocarbons and catalysts at the conditions shown, since, with the experimental method employed, any formaldehyde that has not reacted within a very short time, e.g. 2 to 5 seconds, is removed from the reaction zone in the vapor stream.

TABLE V.—AROMATIC FEED COMPOSITIONS (PERCENT)

| Run No. | 3,4 | 5 | 6 | 10 |
|---|---|---|---|---|
| Aromatic: | | | | |
|   Ethylbenzene | 4 | | | |
|   Ortho-xylene (1,2-dimethylbenzene) | 5 | | | |
|   Meta-xylene (1,3-dimethylbenzene) | 63 | | | |
|   Para-xylene (1,4-dimethylbenzene) | 28 | | | |
|   Hemimellitene (1,2,3-trimethylbenzene) | | <3 | | |
|   Pseudocumene (1,3,4-trimethylbenzene) | | 79 | 83 | |
|   Mesitylene (1,3,5-trimethylbenzene) | | <18 | | |
|   Ortho-ethyltoluene (1-ethyl-2-methylbenzene) | | 3 | | |
|   Prehnitene (1,2,3,4-tetramethylbenzene) | | | | 34 |
|   Isodurene (1,2,3,5-tetramethylbenzene) | | | | 42 |
|   Durene (1,2,4,5-tetramethylbenzene) | | | | 24 |

(D) Alkylation of aromatics using silica gel-$Al_2O_3$ catalysts. Mixed xylenes were reacted with 37% formalin in a manner substantially identical to Example IIA, but with catalysts consisting of alumina deposited on silica gel. With an uncalcined catalyst containing about 12% by weight $Al_2O_3$, formaldehyde conversion was essentially nil. With calcined catalysts containing, respectively, 0.5%, 4% and 13% by weight $Al_2O_3$, formaldehyde conversions were 87%, 83.5% and 67.5% by weight respectively.

*Example III*

(A) Ditolylmethane was hydrocracked in admixture with hydrogen by passing it over a tungsten-nickel sulfide pelleted catalyst at 400° C., 260 p.s.i.g. pressure, LHSV of 5 and a hydrogen to ditolylmethane mole ratio of 4. The feed was 50 to 75% converted to other products with 100% yield. The hydrocracking was carried out by vaporizing the ditolylmethane, mixing it with the hydrogen, preheating the mixture to about the reaction temperature, and passing the mixture over the catalyst packed in a steel reaction tube, while maintaining the temperature at the selected value. The product was fractionated by distillation with the recovery of 61% w. low boiling fraction which contained 53% xylene and 46% toluene and 39% w. higher boiling components comprising predominantly dimer and trimer (88:12 ratio). The xylene product isomer distribution was about 75% p-xylene, 22% ortho-xylene and 3% m-xylene.

(B) A portion of the total alkylate of Example IA was hydrocracked under the same conditions as in IIIA. In this case the total yield of low boiling product was 32% by weight, containing 63% w. xylene and 37% w. toluene, and 68% higher boiling material. The fact that the xylene content was greater than the toluene content is the result of cracking of alkylates higher than "dimer." Thus, a "trimer" yields two moles of xylene per mole of toluene.

TABLE IV

| Run No. | Catalyst | Feed Aromatic | | Ultimate Molar Ratio | Reaction Temperature, °C. | Time for Formal in Addition, min. | Volume Ratio, Aromatics: Catalyst | Conversion of Formaldehyde, percent | Condensation Product | | |
|---|---|---|---|---|---|---|---|---|---|---|---|
| | | | Boiling Pt. or Range, °C. | | | | | | Diarylmethane, percent | Triaryldimethane, percent | Heavier (as Tetraaryltrimethane), percent |
| 1 | Silica Gel+10% wt. $H_2SO_4$. | Toluene | 110.6 | 7.1/1 | 99–103 | 30 | 5/1 | 63 | | | |
| 2 | ___do___ | Paraxylene | 138.4 | 4.0/1 | 134–136 | 87 | 5/1 | 63 | 67 | 19 | 14 |
| 3 | ___do___ | Xylenes a | 136.2–144 | 6.1/1 | 132–137 | 84 | 10/1 | 94 | | | |
| 4 | Silica Gel+5% wt. $H_2SO_4$. | ___do a___ | 136.2–144 | 6.1/1 | 133–138 | 55 | 5/1 | 90 | 100 | 0 | 0 |
| 5 | Silica Gel+10% wt. $H_2SO_4$. | Trimethylbenzenes a | 162–176.5 | 5.5/1 | 150–160 | 34 | 5/1 | 92 | | | |
| 6 | Silica Gel+1% wt. $H_2SO_4$. | ___do a___ | 162–176.5 | 5.4/1 | 160–164 | 35 | 10/1 | 76 | 97 | b 3 | |
| 7 | Silica Gel+10% wt. $H_2SO_4$. | Mesitylene (99%) | 164.6 | 2.7/1 | 150–158 | 105 | 6/1 | 78 | 89 | b 11 | |
| 8 | ___do___ | Durene (>95%) | 193–5 | 4.7/1 | 155–160 | 59 | ca. 5/1 | 96 | | | |
| 9 | ___do___ | Prehnitene (>90%) | 204 | 1.9/1 | 148–160 | 103 | 5/1 | 89 | | | |
| 10 | ___do___ | Tetramethylbenzenes a. | 193–204 | 3.3/1 | 155–158 | 162 | 5.5/1 | 93 | | | | a Details in Table V.
b Total heavier than diarylmethane, calculated as triaryldimethane.

Example IV

The recrystallized bis-(2,4,5-trimethylphenyl)methane product from Example IE, having a melting point of 70–72° C. was hydrocracked over a W/Ni/S catalyst at about 450° C., a pressure of about 600 p.s.i.g. and a mole ratio of hydrogen to alkylate of 10 to 1, respectively. Durene was recovered from the product in a yield of above 95% based on the pseudocumene alkylate converted, at a conversion level of about 91%. The other product was essentially all pseudocumene, with a very small proportion of isodurene and prehnitene being present.

Example V

The remainder of the pseudocumene alkylate from Example IE was hydrocracked similarly to Example IV. The product from the cracking was predominantly durene with minor proportions of isodurene and prehnitene, but larger proportions than in Example IV, in addition to pseudocumene.

Example VI

A portion of the total alkylate of Example IIB was hydrocracked by passage with 2.9 moles of hydrogen per mole of alkylate over a tungsten-nickel sulfide catalyst at a temperature of about 450° C. and a pressure of 35 atmospheres. The product recovered from the hydrocracking step contained about 95 mole percent of pseudocumene, based on trimethylbenzenes, and xylene isomers of the following distribution: 1.5% ortho-xylene, 6.3% para-xylene, 91.8% meta-xylene and no ethylbenzene.

Example VII

When a 162° C. to 173° C. distillate fraction from a refinery xylene bottoms product, as described in Table II, and containing about 90% pseudocumene is alkylated with formaldehyde in the presence of sulfuric acid—aqueous methanol as catalyst, an alkylate product comprising essentially "dimers" is readily obtained. The hydrocracking of this "alkylate" over a W/Ni/S catalyst under a pressure of about 600 p.s.i.g. and at a temperature of about 450° C., with a mole ratio hydrogen/alkylate of about 5, yields a mixture composed essentially of tri- and tetra-methylbenzene compounds. The trimethylbenzenes are readily separated by distillation as distillate for recycle to alkylation, to give a residual mixture composed essentially of durene, isodurene and prehnitene. The durene is readily recovered in a yield of about 83 mole percent, based on trimethylbenzenes consumed.

About 17 mole percent of a mixture of isodurene and prehnitene are recovered, being about 10% isodurene and 7% prehnitene. The prehnitene (M.P.=—4° C.) and isodurene (M.P.=—24° C.) are separable by fractional crystallization.

Example VIII

When the mixture of isodurene, prehnitene and unseparated durene from Example VII is alkylated with formaldehyde an alkylate, bis-(2,3,4,6-tetramethylphenyl)methane is obtained which has a melting point above 150° C. and is slightly soluble in toluene. When this alkylate is hydrocracked similar to the process of Example VII, pentamethylbenzene is obtained as product admixed with a mixture of isodurene, prehnitene and durene. The pentamethylbenzene (M.P. 53° C.) is readily recovered by crystallization and filtration or centrifugation.

Example IX.—Hydrocracking of bis-(6(or 7)methyl-naphth-2-yl)methane

When beta-methylnaphthalene is methylated with formaldehyde, utilizing methanolic sulfuric acid as catalyst, a mixture is obtained composed essentially of bis-(6(and 7)methylnaphth-2-yl)methane and the mixed isomer thereof, namely, 6,7'-dimethyl-naphth-2-yl methane. Hydrocracking of this product under the conditions of Example VII yields predominantly a mixture of 2,6- and 2,7-dimethylnaphthalene, in addition to the "regenerated" beta-methylnaphthalene.

Example X

When bis-(2,4,5-trimethylphenyl)methane product was hydrocracked similarly to Example IV, with a catalyst of mixed molybdenum and tungsten sulfides (10% wt. of each metal) on activated $Al_2O_3$, improved results, in conversion and catalyst life, were obtained.

Example XI

When Example III is repeated except that the catalyst charged to the reactor is a mixture of nickel and tungsten oxides (nickel tungstate) and a small amount of hydrogen sulfide is incorporated in the feed stream (about 1 mole percent), the ditolylmethane is hydrocracked in essentially the same manner as in Example III.

Example XII

When Example III is repeated except that the catalyst employed is a composited cobalt oxide-molybdenum oxide (Co/Mo/O) catalyst, the di-p-tolylmethane is readily converted in similar proportions to para-xylene and toluene.

Example XIII

When a mixture of xylenes obtained by hydrocracking of ditolylmethane such as illustrated in Example III is alkylated with 50 mole percent formaldehyde in the manner described in Example IIA and the resulting alkylate is again hydrocracked, in the manner of Example VI, the resulting trimethylbenzene product consists of a high percentage of pseudocumene and is the result of converting 50% of the ortho-xylene and 18% of the para-xylene contained in the feed to the xylene alkylation. The distribution of the xylenes in the various streams is illustrated in Table VI in which the moles of each component in the several streams, the percent composition of the streams and the percent of the feed component present in the streams are given. The several streams are identified by the Roman numerals as shown in Fig. 1.

TABLE VI

| | Ortho-xylene | Meta-xylene | Para-xylene | Total |
|---|---|---|---|---|
| (I) Feed: | | | | |
| Moles and Percent Composition | 24 | 3 | 73 | 100 |
| (IA) Xylenes unreacted: | | | | |
| Moles | 6 | 0 | 44 | 50 |
| Percent composition | 12 | 0 | 88 | 100 |
| Percent of feed component | 25 | 0 | 60 | |
| (III) Xylenes recovered from hydrocracking: | | | | |
| Moles | 6 | 2 | 16 | 24 |
| Percent composition | 25 | 8 | 67 | 100 |
| Percent of feed component | 25 | 67 | 22 | |
| (IA+III) Total Xylenes Recovered: | | | | |
| Moles | 12 | 2 | 60 | 74 |
| Percent composition | 16 | 3 | 81 | 100 |
| Percent of feed compound | 50 | 67 | 82 | |
| (IV) Trimethylbenzene Product: | | | | |
| Moles of feed component converted | 12 | 1 | 13 | 26 |
| Percent of feed component converted | 50 | 33 | 18 | |

Example XIV

In order to improve the selectivity of conversion of ortho- and meta-xylene to pseudocumene over the results obtained in Example XIII the total xylene mixture produced from hydrocracking of ditolylmethane is first subjected to fractional crystallization to recover para-xylene therefrom as well as a mixed xylenes stream containing 50% para-xylene. This mixed xylenes stream is then alkylated and hydrocracked and the total xylenes recovered, including unconverted xylenes and xylenes reconstituted in the hydrocracking step, are again subjected to crystallization to produce a mixture containing only 50% para-xylene and the procedure of alkylation and hydrocracking is repeated. As a result of this two-stage operation, 63% of the original ortho-xylene, 67% of the original meta-xylene and only 8% of the original para-xylene is converted to trimethylbenzene, while 73% of the original para-xylene is recovered as pure para-xylene product from the crystallization. The analysis of the various streams, based on 100 moles of mixed xylenes produced from ditolylmethane, is illustrated in table VII.

TABLE VII

|  | First stage | | |
| --- | --- | --- | --- |
|  | Ortho-xylene | Meta-xylene | Para-xylene |
| Feed: | | | |
| Moles and Percent Composition | 24 | 3 | 73 |
| Separated by Crystallization: | | | |
| Moles | 0 | 0 | 46 |
| Percent Composition | 0 | 0 | 100 |
| Percent of feed component | 0 | 0 | 62 |
| Charged to Condensation: | | | |
| Moles | 24 | 3 | 27 |
| Percent Composition | 44 | 6 | 50 |
| Percent of feed component | 100 | 100 | 37 |
| Unreacted Xylenes recovered: | | | |
| Moles | 9 | 0 | 18 |
| Percent Composition | 33 | 0 | 67 |
| Percent of feed component | 38 | 0 | 25 |
| Xylenes recovered from hydrocracking: | | | |
| Moles | 5 | 2 | 5 |
| Percent Composition | 42 | 16 | 1 |
| Percent of feed component | 21 | 67 | 7 |
| Total Xylenes recovered: | | | |
| Moles | 14 | 2 | 23 |
| Percent Composition | 36 | 5 | 59 |
| Percent of feed component | 59 | 67 | 32 |
| Trimethylbenzenes Product: | | | |
| Moles of feed component converted | 10 | 1 | 4 |
| Percent of feed component converted | 41 | 33 | 5 |

|  | Second Stage | | |
| --- | --- | --- | --- |
|  | Ortho-xylene | Meta-xylene | Para-xylene |
| Feed: | | | |
| Moles | 14 | 2 | 23 |
| Percent Composition | 36 | 5 | 59 |
| Percent of feed of component [a] | 59 | 67 | 32 |
| Separated by Crystallization: | | | |
| Moles | 0 | 0 | 7 |
| Percent Composition | 0 | 0 | 100 |
| Percent of feed component [a] | 0 | 0 | 10 |
| Charged to Condensation: | | | |
| Moles | 14 | 2 | 16 |
| Percent Composition | 44 | 6 | 50 |
| Percent of feed component [a] | 59 | 67 | 22 |
| Unreacted Xylenes Recovered: | | | |
| Moles | 6 | 0 | 11 |
| Percent Composition | 35 | 0 | 65 |
| Percent of feed component | 25 | 0 | 15 |
| Xylenes Recovered from hydrocracking: | | | |
| Moles | 3 | 1 | 3 |
| Percent Composition | 43 | 14 | 43 |
| Percent of feed component | 12 | 33 | 4 |
| Total Xylenes Recovered: | | | |
| Moles | 9 | 1 | 14 |
| Percent of feed component | 37 | 33 | 19 |
| Trimethylbenzene Product: | | | |
| Moles of feed component converted | 5 | 1 | 2 |
| Percent of feed component converted | 21 | 33 | 3 |

OVERALL RESULTS (TWO STAGES)

|  | Ortho-xylene | | Meta-xylene | | Para-xylene | |
| --- | --- | --- | --- | --- | --- | --- |
|  | Moles | percent | Moles | percent | Moles | percent |
| Conversion of Feed (Moles): | | | | | | |
| To Pure Para-xylene | 0 | 0 | 0 | 0 | 53 | 73 |
| To Trimethylbenzenes | 15 | 63 | 2 | 67 | 6 | 8 |
| Pseudocumene | 14.2 |  | 1.9 |  | 6.0 |  |
| Mesitylene | 0 |  | <0.1 |  | 0 |  |
| Hemimellitene | 0.1 |  | <0.1 |  | 0 |  |
| Unreacted | 9 | 37 | 1 | 33 | 14 | 19 |

[a] Based on feed to first stage.

This application is a continuation-in-part of patent application Serial No. 399,570, filed December 21, 1953, now U.S. Patent No. 2,819,322, January 7, 1958.

I claim as my invention:

1. A process for the production of durene and recovery of para-xylene from mixed xylenes which comprises contacting in a condensation zone a mixture of $C_8$ aromatics containing at least meta- and para-xylene and a $C_9$ aromatics stream consisting essentially of pseudocumene, obtained from sources described hereinafter, with formaldehyde in the presence of an acidic catalyst selected from the group consisting of liquid acid catalysts containing sulfuric acid as active ingredient and solid acidic catalysts selected from the group consisting of silica gel containing from 0.1 to 15% by weight of an adsorbed mineral acid and calcined silica alumina composite containing from 0.1 to 13% alumina to produce a condensation product containing at least the corresponding diarylmethanes of only a portion of the $C_8$ aromatics and of pseudocumene, separating the effluent from said condensation zone by fractional distillation into a first $C_8$ aromatics stream, a first $C_9$ aromatics stream consisting essentially of pseudocumene and a stream containing at least a portion of said condensation product, hydrocracking at least a portion of said condensation product at an elevated temperature under hydrocracking conditions in the presence of hydrogen and of a high melting essentially neutral inorganic substance having hydrogenating activity, selected from the group consisting of oxides, sulfides, and composites thereof of group VI to group VIII metals having atomic numbers of at least 24 and of activated carbon, as catalyst, subjecting the hydrocracked product to fractional distillation to recover therefrom a second $C_8$ aromatics stream, a second $C_9$ aromatics stream and a $C_{10}$ aromatics stream containing at least about 90% durene, separating said second $C_9$ aromatics stream to recover therefrom a third $C_9$ aromatics stream consisting essentially of pseudocumene, returning to said condensation zone at least said second $C_8$ stream and said first and third $C_9$ streams, and recovering para-xylene and durene in high purity from said first $C_8$ stream and said $C_{10}$ stream, respectively.

2. A process according to claim 1 in which said acidic catalyst is a finely divided porous silica gel having substantial surface acidity and said essentially neutral inorganic substance having hydrogenating activity is a metal sulfide.

3. A process according to claim 1 in which said acidic catalyst consists of finely divided porous silica gel having deposited thereon from 0.5 to 15% by weight of sulfuric acid and said high melting essentially neutral inorganic substance having hydrogenating activity is a tungsten-molybdenum sulfide catalyst.

4. A process for introducing a methyl group into a para-position of a polymethylbenzene selected from the group consisting of ortho-xylene, meta-xylene, pseudocumene and mixtures thereof to form therefrom a methylated polymethylbenzene product predominating in a para-methyl-substituted polymethylbenzene which process comprises the steps: (1) contacting a hydrocarbon feed containing said polymethylbenzene with formaldehyde in the presence of an acidic catalyst selected from the group consisting of liquid acid catalysts containing sulfuric acid as active ingredient and solid acidic catalysts selected from the group consisting of silica gel containing from 0.1 to 15% by weight of an adsorbed mineral acid and calcined silica-alumina composite containing from 0.1 to 13% alumina to produce a first intermediate product containing diarylmethane alkylate, (2) hydrocracking said first intermediate product at an elevated temperature under hydrocracking conditions in the presence of hydrogen and of a high melting essentially neutral inorganic substance having hydrogenating activity, selected from the group consisting of oxides, sulfides and composites thereof of group VI to group VIII metals having atomic numbers of at least 24 and of activated carbon, as catalyst, to produce a second intermediate product consisting essentially of both said para-methyl-substituted polymethylbenzene and a regenerated quantity of the polymethylbenzene, (3) separating said regenerated quantity of the polymethylbenzene and recycling it to step (1), and (4) recovering the methylated polymethylbenzene product.

5. A process according to claim 4 in which said acidic catalyst is a liquid acid catalyst containing sulfuric acid as active ingredient.

6. A process according to claim 5 in which said hydrocracking catalyst is a sulfide catalyst.

7. A process according to claim 5 in which said hydrocracking catalyst is an oxide catalyst.

8. A process according to claim 5 in which said hydrocracking catalyst is a tungsten-molybdenum-sulfide catalyst.

9. A process according to claim 5 in which said polymethylbenzene is ortho-xylene and said para-methyl-substituted polymethylbenzene is pseudocumene.

10. A process according to claim 5 in which said polymethylbenzene is meta-xylene and said para-substituted polymethylbenzene is pseudocumene.

11. A process according to claim 5 in which said hydrocarbon feed consists of a mixture of xylenes and said para-methyl-substituted polymethylbenzene product is pseudocumene.

12. A process according to claim 5 in which said hydrocarbon feed is a mixture of xylenes and pseudocumene and said para-methyl-substituted polymethylbenzene product comprises pseudocumene and durene.

13. A process for converting pseudocumene to durene which comprises the steps: (1) contacting a hydrocarbon feed containing pseudocumene with formaldehyde in the presence of a liquid acidic catalyst containing sulfuric acid as its active ingredient to produce a first intermediate product containing dipseudocumylmethane alkylate, (2) hydrocracking said dipseudocumylmethane alkylate at an elevated temperature under hydrocracking conditions in the presence of hydrogen and of a high melting essentially neutral inorganic substance having hydrogenating activity, selected from the group consisting of oxides, sulfides and composites thereof of group VI to group VIII metals having atomic numbers of at least 24 and of activated carbon, as catalyst, to produce a second intermediate product consisting essentially of both durene and a regenerated quantity of pseudocumene, (3) separating said regenerated quantity of pseudocumene and recycling it to step (1), and (4) recovering durene product.

References Cited in the file of this patent

UNITED STATES PATENTS

| 2,338,973 | Schmerling | Jan. 11, 1944 |
| 2,368,939 | Martin et al. | Feb. 6, 1945 |
| 2,394,751 | Cole | Feb. 12, 1946 |

FOREIGN PATENTS

| 446,450 | Great Britain | Apr. 30, 1946 |

OTHER REFERENCES

Globus et al.: Journal of Applied Chemistry of Russia, vol. 17, 1944 (pages 623–627 relied on).